United States Patent
Chu et al.

(10) Patent No.: US 7,903,718 B2
(45) Date of Patent: Mar. 8, 2011

(54) ENHANCED 1-HOP DYNAMIC FREQUENCY HOPPING COMMUNITIES

(75) Inventors: Liwen Chu, San Jose, CA (US);
Wendong Hu, San Jose, CA (US);
George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 660 days.

(21) Appl. No.: 11/969,676

(22) Filed: Jan. 4, 2008

(65) Prior Publication Data

US 2008/0165831 A1 Jul. 10, 2008

Related U.S. Application Data

(60) Provisional application No. 60/884,160, filed on Jan. 9, 2007.

(51) Int. Cl.
*H04B 1/00* (2006.01)
(52) U.S. Cl. ......... 375/132; 375/133; 375/135; 375/136; 375/316
(58) Field of Classification Search ................ 375/132, 375/133, 135, 136, 316
See application file for complete search history.

(56) References Cited

U.S. PATENT DOCUMENTS

| 5,822,361 | A | 10/1998 | Nakamura et al. |
| 6,031,863 | A | 2/2000 | Jusa et al. |
| 7,085,306 | B1 * | 8/2006 | Voldman et al. ............. 375/132 |
| 7,586,990 | B2 * | 9/2009 | Subramanian et al. ....... 375/260 |

FOREIGN PATENT DOCUMENTS

| EP | 0 709 983 | 5/1996 |
| EP | 1 850 611 | 10/2007 |

OTHER PUBLICATIONS

Wendong Hu et al., "Cognitive Radios for Dynamic Spectum Access—Dynamic Frequency Hopping Communities for Efficient IEEE 802.22 Operation", IEEE Communications Magazine, IEEE Service Center, Piscataway, US, XP011181061, ISSN 0163-6804, col. 44, No. 5, May 1, 2007, pp. 80-87.

* cited by examiner

*Primary Examiner* — Ted M Wang
(74) *Attorney, Agent, or Firm* — Lisa K. Jorgenson; William J. Kubida (57) ABSTRACT

A Dynamic Frequency Hopping Community (DFH Community) is formed from a plurality of Wireless Regional Area Network (WRAN) cells wherein each of the plurality of WRAN cells within the DFH Community is a one-hop neighbor of the leader cell. The leader cell sets and distributes a hopping pattern for use among the WRAN cells based on, in part, the number of usable channels and whether a WRAN cell is shared by two groups in the DFH Community.

21 Claims, 11 Drawing Sheets

ENHANCED 1-HOP DYNAMIC FREQUENCY HOPPING COMMUNITIES

RELATED APPLICATION

The present application relates to and claims priority from U.S. Provisional Patent Application No. 60/884,160 filed on Jan. 9, 2007.

BACKGROUND OF THE INVENTION

1. Field of the Invention

Embodiments of the present invention relate, in general, to systems and methods for enhanced 1-Hop Dynamic Frequency Hopping Communities, and particularly to algorithms to coordinate channel hopping and increase Dynamic Frequency Hopping Communities' channel efficiency.

2. Relevant Background

Dynamic Frequency Hopping ("DFH") is a technique that incorporates non-traditional dynamic channel allocation with slow frequency hopping. The main objective in DFH is to provide capacity improvements through the addition of interference avoidance that are higher than those provided by conventional frequency hopping while preserving interference averaging characteristics of conventional frequency hopping in order to provide robustness to rapid changes in interference.

Generally, the key concept behind this intelligent type of frequency hopping is to adjust or create frequency hopping patterns based on interference measurements. DFH uses slow frequency hopping and adaptively modifies the utilized frequency hopping pattern based on rapid frequency quality measurements, sometimes referred to as Quality of Service ("QoS") measurements. This technique combines traditional frequency hopping with dynamic channel allocation, where a channel is one frequency in a frequency hop pattern. The continuous modification of frequency hop patterns is based on measurements representing an application of dynamic channel allocation to slow frequency hopping. Modifications are based on rapid interference measurements and calculations of the quality of frequencies used in a system by all Customer Premise Equipments ("CPEs") and Base Stations ("BSs"). The target of these modifications is tracking the dynamic behavior of the channel quality as well as of interference. One significant application of DFH is found in the operation of what is referred to in the art as a Wireless Regional Area Network ("WRAN").

A WRAN cell consists of a BS and the associated CPEs that communicate to the BS via a fixed point-to-multi-point radio air interface (i.e. an antenna). WRAN operations need to satisfy two apparently conflicting requirements: assure the QoS satisfaction for WRAN services while providing reliable and timely frequency spectrum sensing. Current sensing requirements state that incumbent signals shall be detected by WRAN devices with no more than a 2 second delay. Thus a WRAN cell must perform sensing on a working channel every 2 seconds. A channel that is to be sensed cannot be used for data transmission, thus a cell operating consistently on a single channel must interrupt data every 2 seconds for sensing. Such a non-hopping mode leads to periodic interruptions and can significantly decrease system throughput and impair QoS. The solution to this problem, as will be appreciated by one skilled in the art, was DFH.

As previously described, DFH differs from conventional frequency hopping in the way the patterns are built. Instead of using random or pre-defined repetitive hopping patterns, DFH patterns are generated for active users on the fly. In this manner the hopping patterns can be adjusted to adapt to interference changes. The basic idea behind creating the patterns is to choose the best frequency for each hop. This best frequency corresponds to the frequency that is interfered with the least. DFH thus requires continuous estimation and measurement of the interference at every frequency from every single hop of a pattern. At each hopping instant, the BS or the CPE measures the QoS of each frequency, filters the measurement to average out the instantaneous Rayleigh fading effects, and then sends the data using the 'best' frequency chosen according to some quality selection criteria. Typically the hopping patterns for users within the same cell are orthogonal. The performance of an established link is monitored, and upon the performance dropping below a threshold, a better hopping pattern is generated.

In DFH communication, components of a WRAN cell (the CPEs) hop over a set of channels. During operation on a working channel, sensing is performed in parallel on the intended next working channels. After 2 seconds, a channel switch takes place: one of the intended next working channels becomes the new working channel, and the channel previously used is vacated. Hence, an interruption is no longer required for sensing. Obviously, efficient frequency usage and mutual interference-free spectrum sensing can only be achieved if multiple neighboring overlapping WRAN cells operating in the DFH mode coordinate their hopping behavior.

As described a WRAN cell operating in the DFH mode uses the working (in-band) channel for data transmission and performs spectrum sensing on out-of-band channels simultaneously. This operation is referred to as Simultaneous Sensing and Data Transmissions (SSDT). Guard bands between the in-band and out-of-band channels are allocated to mitigate adjacent interference caused by data transmission to the out-of-band sensing. An out-of-band channel sensed to be vacant is considered to be validated. A WRAN system in the DFH mode thus dynamically selects one of the channels validated in a previous operation period for data transmission in the next operation period.

A DFH Community is a non-empty set of neighboring WRAN cells following a common protocol that supports a coordinated DFH operation in order to ensure mutual interference-free channel sensing and to minimize the channel usage, applying the DFH phase-shifting. A DFH Community has one leader and, possibly, some community members. One definition of a DFH Community, as is known to those skilled in the art, is that one-hop BS neighbors create a DFH Community meaning that each WRAN cell in a community is within one-hop of the other members of the cell. A priority value is used to elect the DFH Community leader from those members and the elected leader decides when and which channel to hop among the available channel set for each community member. The community members hop among the same available channels according to the leader's decision in a synchronized fashion. Thus the DFH Community leader is responsible for decisions about community membership, calculating the hopping patterns (phase-shifting sequences) for all members and distributing this information within the community. Members provide the leader with their neighborhood and channel availability information, i.e. information about their sensing results and observed channel usage of the neighboring WRAN cells. Within the DFH Community, hopping information does not change as long as the community is stable (i.e. no new member arrives or existing member departs). Using this method hopping collisions can be avoided and real-time inter-BS communication is not necessary.

DFH Community is thus a concept introducing coordination among cells. The key idea of a DFH Community is that neighboring WRAN cells form cooperating communities which choose their hopping channels and perform DFH operation in a coordinated manner. As discussed above, DFH Community leads to a better QoS and throughput behavior while requiring a modest amount of channels for hopping. A DFH Community enables coexistence of multiple WRAN cells and can also be used to coordinate channel usage of cells operating in the non-hopping mode. Moreover, coordinated channel hopping can give WRAN cells more time to do channel sensing and increase channel efficiency.

It has been shown that only N+1 vacant channels (i.e., channels free of both incumbents and other WRANs) are needed under certain conditions to ensure cells can operate without collisions.

Figure 1:
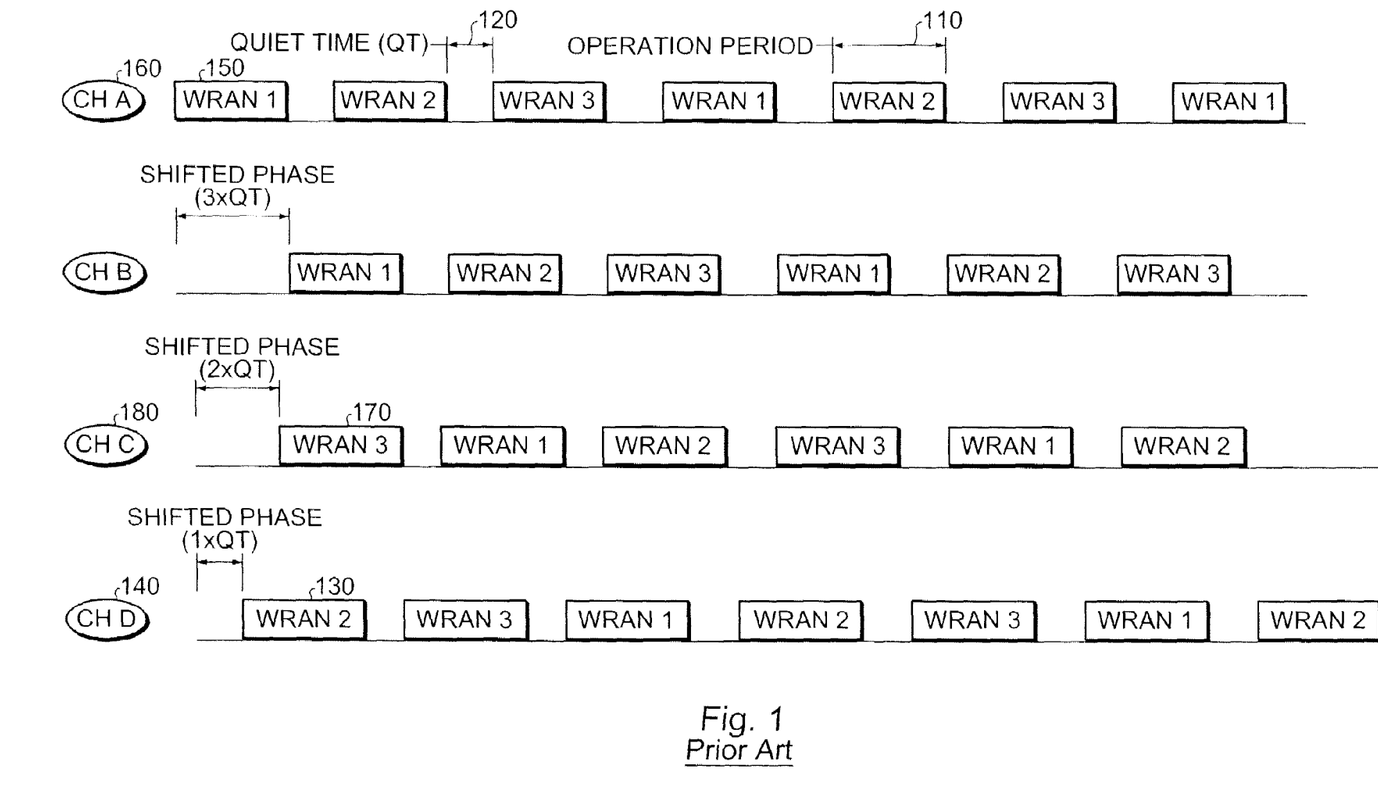
FIG. 1 illustrates the Phase-shifting DFH operation of three overlapping WRAN cells over four vacant channels as is known in the prior art.

FIG. 1 illustrates the Phase-shifting DFH operation of three, N=3, overlapping WRAN cells over four, (N+1)=4, vacant channels as is known in the prior art. Each WRAN cell shifts its DFH operation phase 110 by one Quiet Time ("QT") 120 against the operation phase of the previous WRAN cell as shown in FIG. 1. For instance, WRAN2 130 on channel D 140 shifts its operation by one QT 120 against the operation of WRAN1 150 on channel A 160, and WRAN3 170 on channel C shifts by one QT 120 against that of WRAN2 130 on channel D 140. During a QT 120, channel sensing is performed. This implies that a QT 120 has to be at least equal to the minimum time required for reliable channel sensing.

Thus a set of N overlapping cells can operate continuously using (N+1) channels (Channels A, B, C, and D in the example presented in FIG. 1) as long as the length of a single transmission is larger than the product N*QT. Imposing the above explained hopping pattern of time shifted jumps is, however, only possible in case of strict coordination within the DFH Community.

Defining a DFH Community as a number of WRAN cells being one-hop neighbors limits channel efficiency. Redefining the community as WRAN cells that are one-hop neighbors of the leader can enhance efficiency, but such a definition presents several challenges including deciding whether to accept a one-hop neighbor WRAN cell as a community member and how to calculate the hopping mode for each community member. These and other issues are addressed by the present invention.

SUMMARY OF THE INVENTION

Systems and methods for enhanced DFH among a plurality of WRAN cells is disclosed. According to one embodiment of the present invention, a DFH Community is formed from a plurality of WRAN cells. One of these plurality of WRAN cells in the DFH Community is selected as a leader cell. According to one embodiment of the present invention, the DFH Community is formed so that each other of the plurality of WRAN cells within the DFH Community is a one-hop neighbor of the leader cell To facilitate communication between the WRAN cells, a number of channels for use between each of the CPEs and BSs in the plurality of WRAN cells is determined. Using this number the leader sets and distributes a hopping pattern for use among the WRAN cells. According to one embodiment of the present invention, the number of channels needed to ensure interruption free working channels and mutual interference-free sensing among each of the plurality of WRAN cells in the DFH Community is the number of maximum cells in any community group plus the number 2. According to one embodiment of the present invention, a subset of the plurality of WRAN cells that are one-hop neighbors of each other and are each one-hop neighbors of the leader cell form a community group, and each DFH Community includes a plurality of groups.

According to another embodiment of the present invention, a method for DFH among a plurality of WRAN cells is disclosed wherein each WRAN cell includes a BS and a plurality of CPEs. The method forms a DFH Community from the plurality of WRAN cells by identifying one of the plurality of WRAN cells in the DFH Community as a leader cell and ensuring each other of the plurality of WRAN cells within the DFH Community is a one-hop neighbor of the leader cell. During the DFH Community formation process, the number of channels for communicating between each of the CPEs and BSs of the plurality of WRAN cells within the DFH Community is determined. Thereafter the leader cell sets a channel hopping pattern over the determined number of channels so as to provide interruption free working channels and mutual interference-free sensing among each of the plurality of WRAN cells in the DFH Community.

Once formed the leader of the DFH Community receives and evaluates requests from other WRAN cells seeking to join the DFH Community. The leader determines whether the set of useable channels that would be formed form the combination of the WRAN cell seeking admission to the community and those channels already utilized by the community would be sufficient to support the addition of the new cell. If the set of useable channels is less than the required number of channels, the request for admission is denied. When a sufficient number of channels exists to form an appropriate hopping pattern, an analysis is made with respect to the duration of the shortest working or operational period on each channel. When the minimum length of the working period is insufficient to support expanding the group, the request for admission is rejected.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Systems and methods for enhanced communication in a one-hop DFH Community are hereafter disclosed. Embodiments of the present invention describe a one-hop DFH Community in which each WRAN cell is within one-hop of the leader of the DFH Community. According to one embodiment of the present invention, community groups of WRAN cells are defined as composed of WRAN cells that are one-hop neighbors of each other and are not a subset of a different group. Each DFH Community can have a plurality of such groups. Groups that include at least one common WRAN cell beyond the leader cell are defined as neighbor groups.

As will be shown herein, the number of channels needed to ensure interference free DFH is the maximum of the number of WRAN cells in any group of the DFH Community plus the number 2 (N+2) or the maximum of the number of WRAN cells in any group of the DFH Community plus the number 1 (N+1). To describe the situation where N+2 is required, a group graph is defined including a group graph coloring scheme (represented in the Figures of the present invention using various shading techniques). According to one embodiment of the present invention, the group graph is configured by representing each group in a DFH Community as a node in the graph. When two groups within the graph have a common WRAN cell that is not the DFH Community leader, an edge is created between the two nodes corresponding to these two groups. When a group graph can be colored by two colors (each node being coupled to a different colored node), the group graph is a 2-color colorable group graph. When each group in a DFH Community has 3 WRAN cells and the group graph is a 2-color uncolorable group graph (meaning that at least one node is coupled to a node of the same color), the group graph is a strict 2-color uncolorable group graph. N+2 channels are required for the community working in DFH mode whose group graph is a strict 2-color uncolorable graph. Otherwise the N+1 channels are required for the community working in DFH mode (i.e., a 2-color colorable group graph). This combined with a channel hopping scheme as determined by the leader promotes increased channel efficiency.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

DFH Communities are formed on tenet that in order for WRAN cells to overlap channels of communication must be shared and coordinated. Moreover hopping schemes, such as DFH employed by individual WRAN cells to prevent interruption of service, must be expanded to apply to the entire DFH Community. DFH Communities are therefore formed with the understanding that each community group has a hopping pattern and that each community group should use as small a number as possible of working channels. Since each WRAN must include a quiet period for sensing, the combination of the quiet period with the working period must be able to satisfy incumbent user requirements.

Figure 2A:
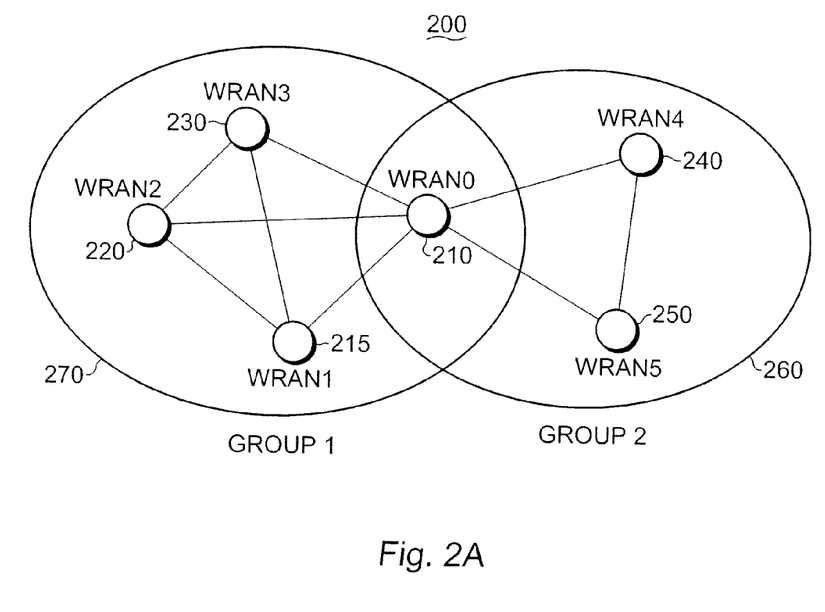
FIGS. 2A and 2B show a five WRAN cell DFH Community and six WRAN cell DFH community respectively, according to one embodiment of the present invention.

FIG. 2A 200 shows a DFH Community comprised of six WRAN cells and two community groups, according to one embodiment of the present invention. As can be seen in FIG. 2A, each WRAN cell 215, 220, 230, 240, 250 is one-hop away from the leader cell, WRAN0 210. According to the definition previously presented, two community groups 260, 270 are present in the DFH Community 200. Group 1 270 is comprised of WRAN0 210, WRAN1 215, WRAN2 220, and WRAN3 230. Group 2 260 is comprised of WRAN0 210, WRAN4 240, and WRAN5 250. According to one embodiment of the present invention, five channels would be necessary to provide an adequate channel hopping pattern since the largest group has four cells and the group graph is a 2-color colorable graph. This number is determined from the maximum number of cells of any of the groups in the DFH Community plus the number 1. In this particular example, group 1 270 has three one-hop neighbors of the leader cell WRAN0 210 for a total of four cells in the group. Thus the minimum number of channels in the channel hopping pattern is five.

Figure 2B:
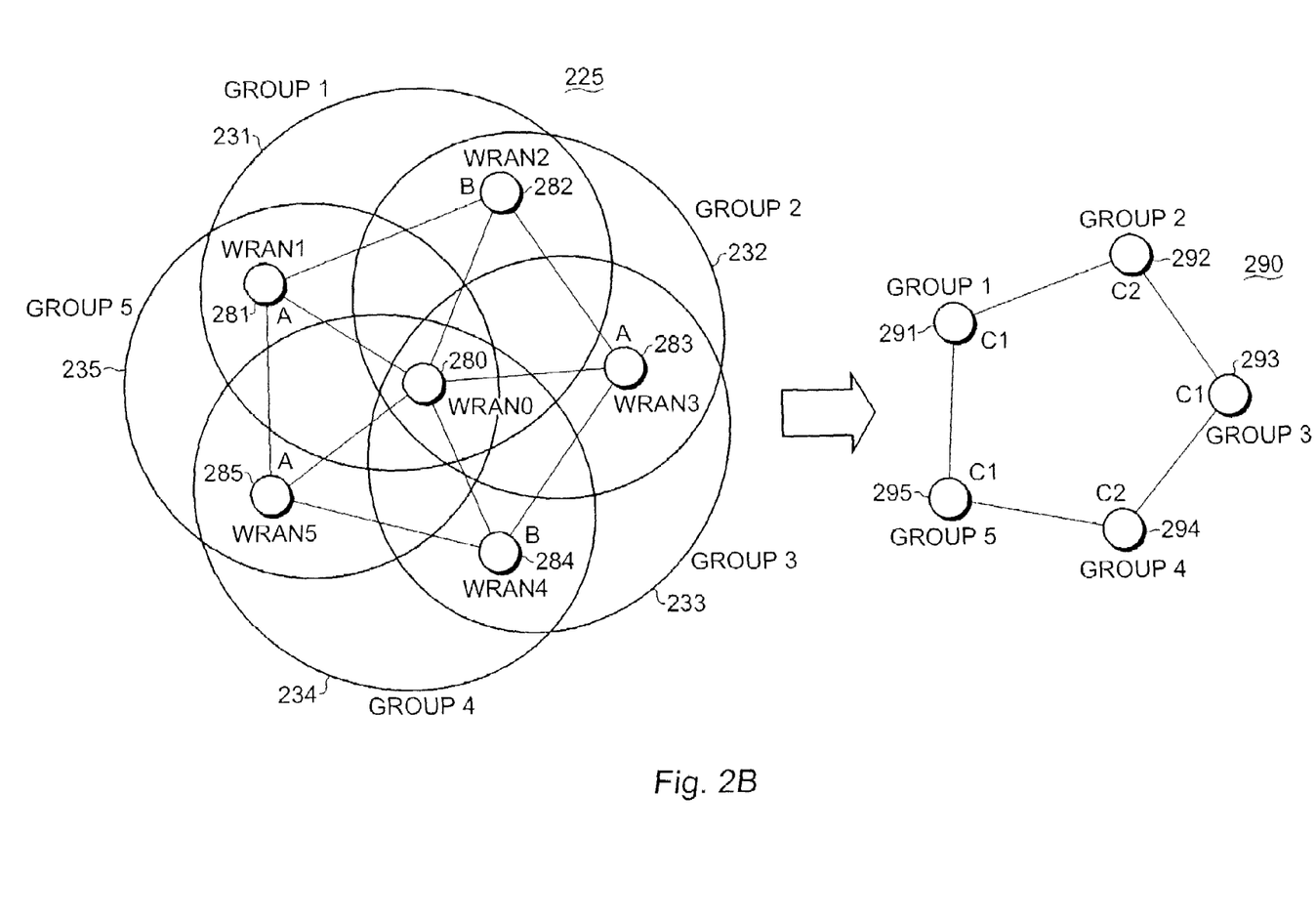

FIG. 2B 225 shows a DFH Community comprised of six WRAN cells and five community groups, according to one embodiment of the present invention. As can be seen in FIG. 2B, each WRAN cell 281, 282, 283, 284, 285 is one-hop away from the leader cell, WRAN0 280. According to the definition previously presented, five community groups 231, 232, 233, 234, 235 are present in this DFH Community 225. Group 1 231 is comprised of WRAN0 280, WRAN1 281, and WRAN2 282. Group 2 232 is comprised of WRAN0 280, WRAN2 282, and WRAN3 283. Group 3 233 is comprised of WRAN0 280, WRAN3 283, and WRAN4 284. Group 4 234 is comprised of WRAN0 280, WRAN4 284, and WRAN5 285. Finally group 5 235 is comprised of WRAN0 280, WRAN5 285, and WRAN1 281.

Depicted to the right of the DFH Community shown in FIG. 2B 225 is a simplified group graph 290. This group graph 290 is comprised of five nodes, one for each of the five groups of the DFH Community 225: node 291 represents Group 1, node 292 represents Group 2, node 293 represents Group 3, node 294 represents Group 4, and node 295 represents Group 5. The edges connecting the nodes show neighboring group relationships. Associated with each group is a color code of either C1 or C2. As can be seen in FIG. 2B a two color scheme of C1 and C2 to color the group graph cannot be used since two neighboring nodes, Group 1 291 and Group 5 295, have the same color C1. According to one embodiment of the present invention, five channels (N+2) would be necessary to provide an adequate channel hopping pattern since the largest group has three WRAN cells and the group graph is a strict 2-color uncolorable graph. This number is determined from the maximum number of WRAN cells of any of the groups in the DFH Community plus the number 2. Thus the minimum number of channels in the channel hopping pattern is five.

As previously discussed the present invention employs a DFH scheme to enable spatially overlapped cells. Each WRAN cell shifts its DFH operation phase by one QT against the operation phase of the previous WRAN. One requirement of a working DFH Community, according to the present invention, is that the shortest working period of the group must be adequate for the number of WRAN cells in a group given the number of usable channels. This factor is significant in the determination of whether a WRAN cell that is outside of the DFH Community is allowed to join the community. Similarly the number of channels available for the entire DFH Community must be considered when a cell is considered to be joined to the DFH Community.

Figure 3A:
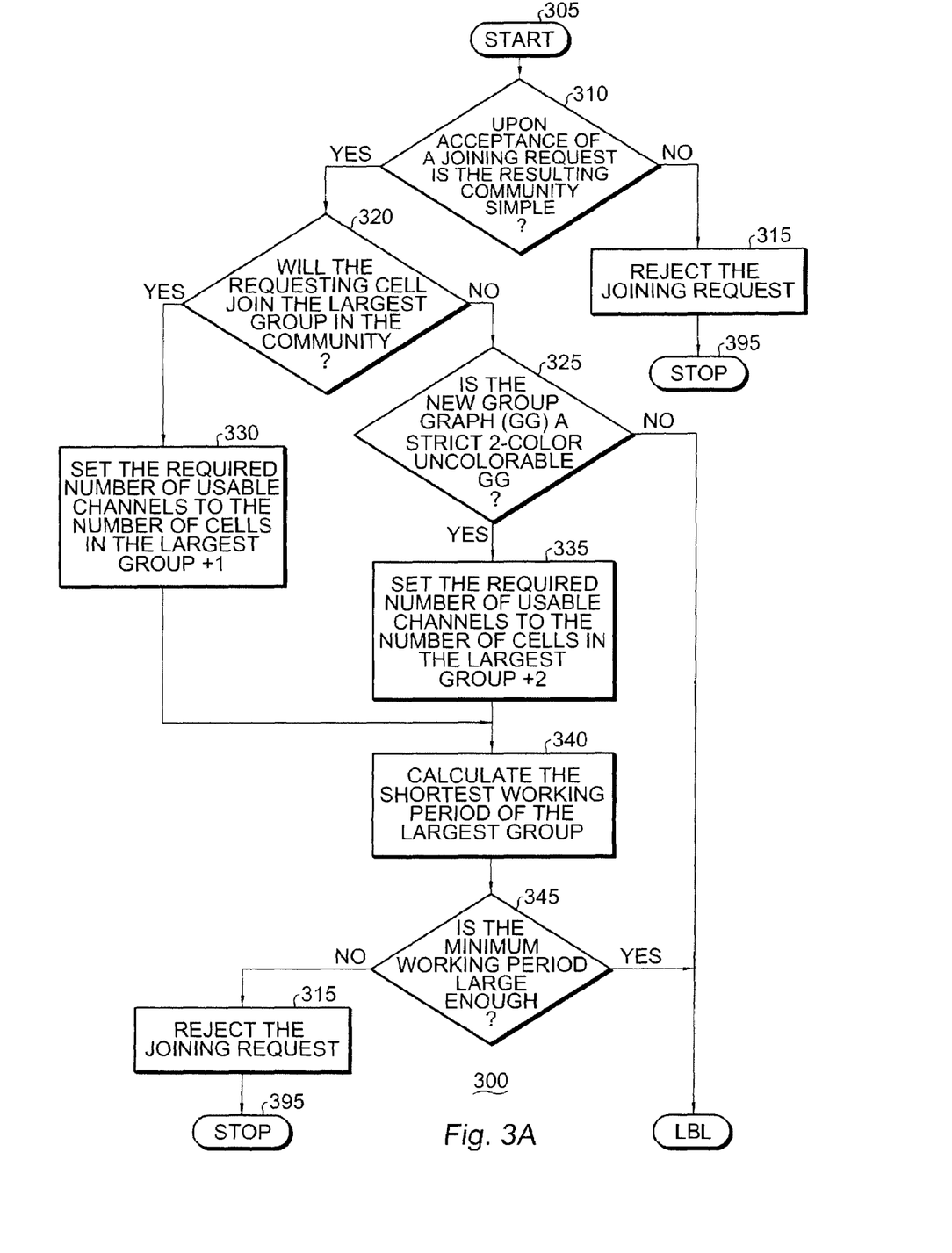
FIG. 3 is a flowchart of one method embodiment for determining whether a WRAN cell can join an established DFH Community according to the present invention.
Figure 3B:
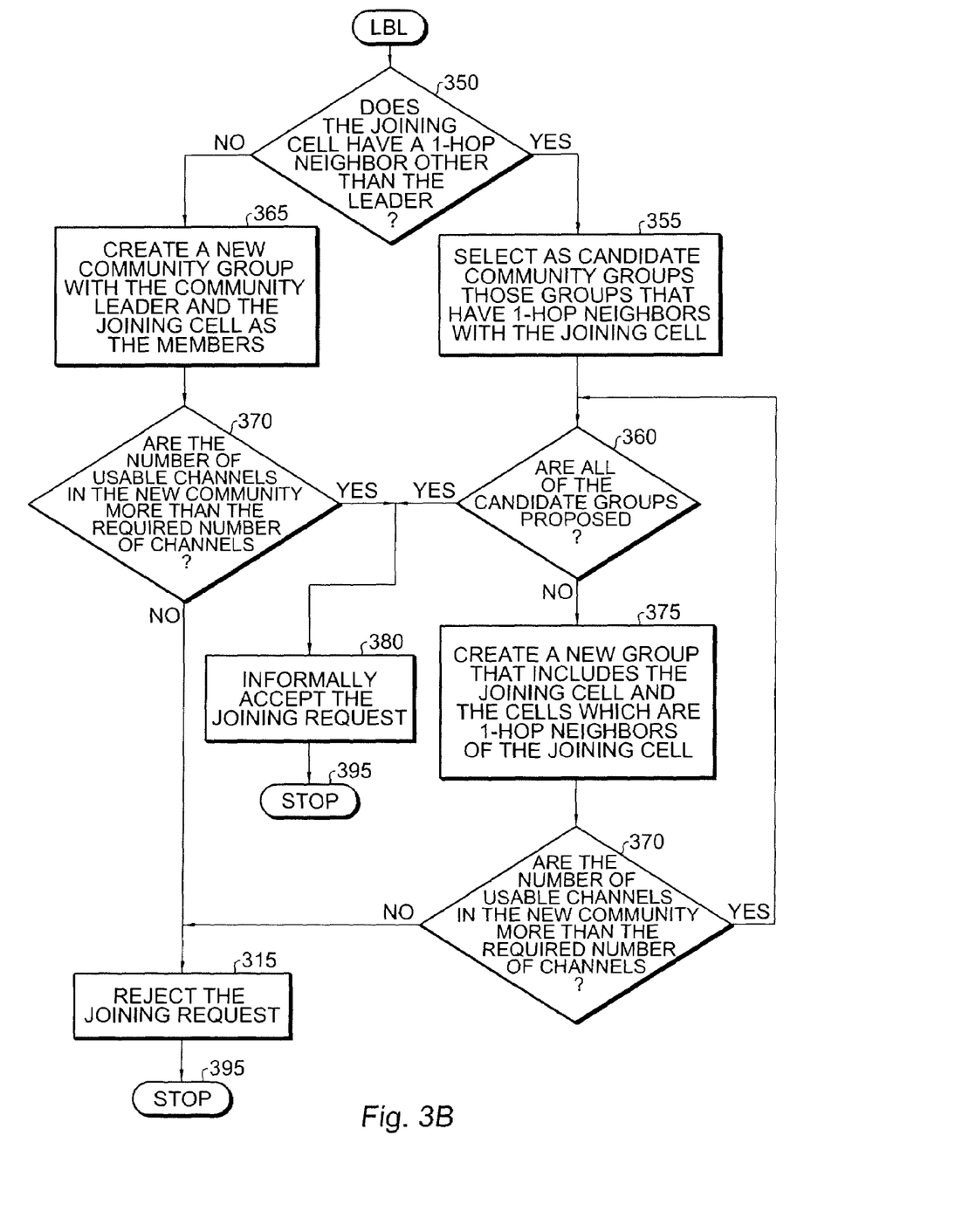
Figure 5:
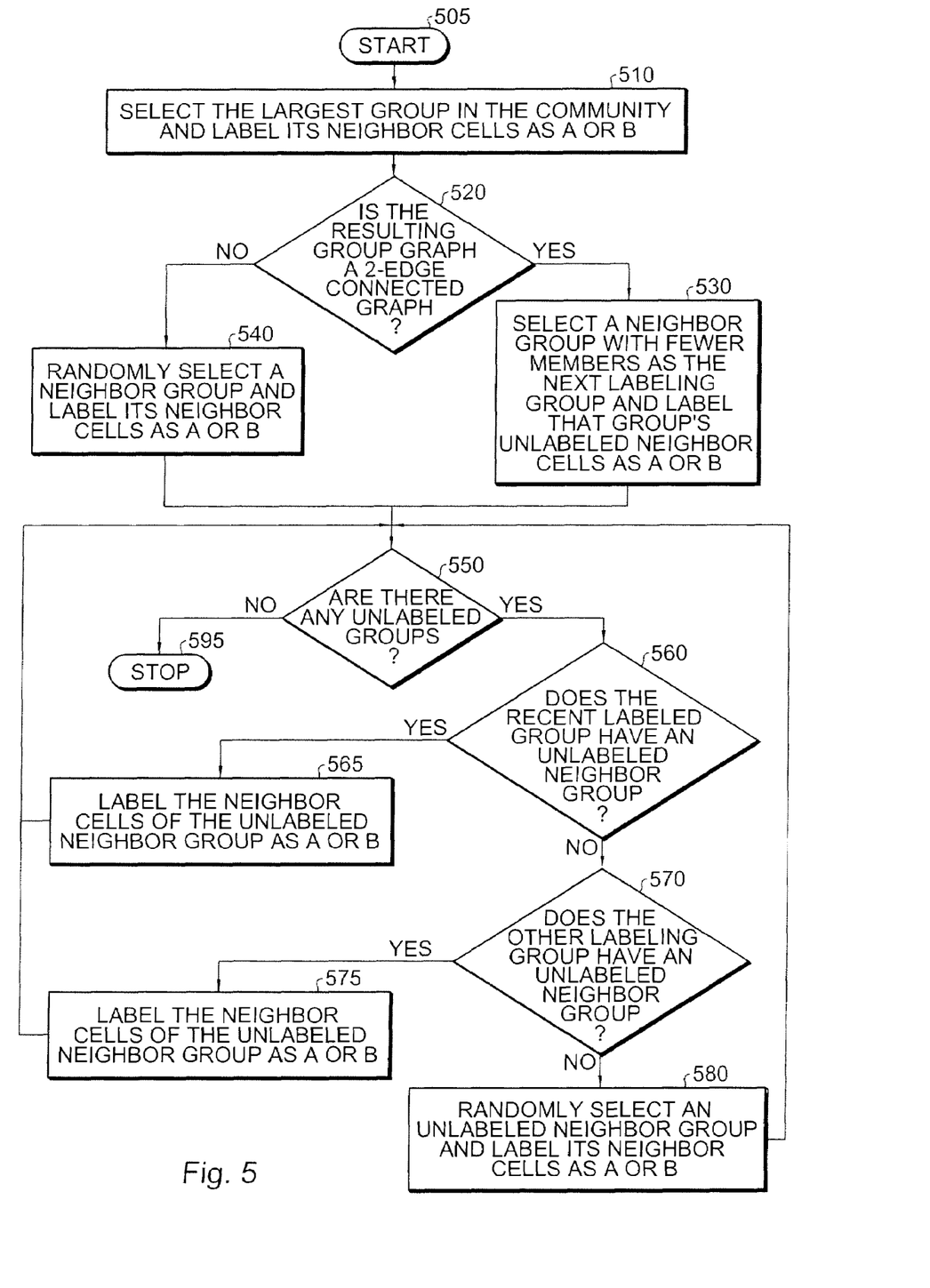
FIG. 5 is a flowchart of one method embodiment for labeling DFH Community groups in order to determine a hopping pattern, according to the present invention.
Figure 7:
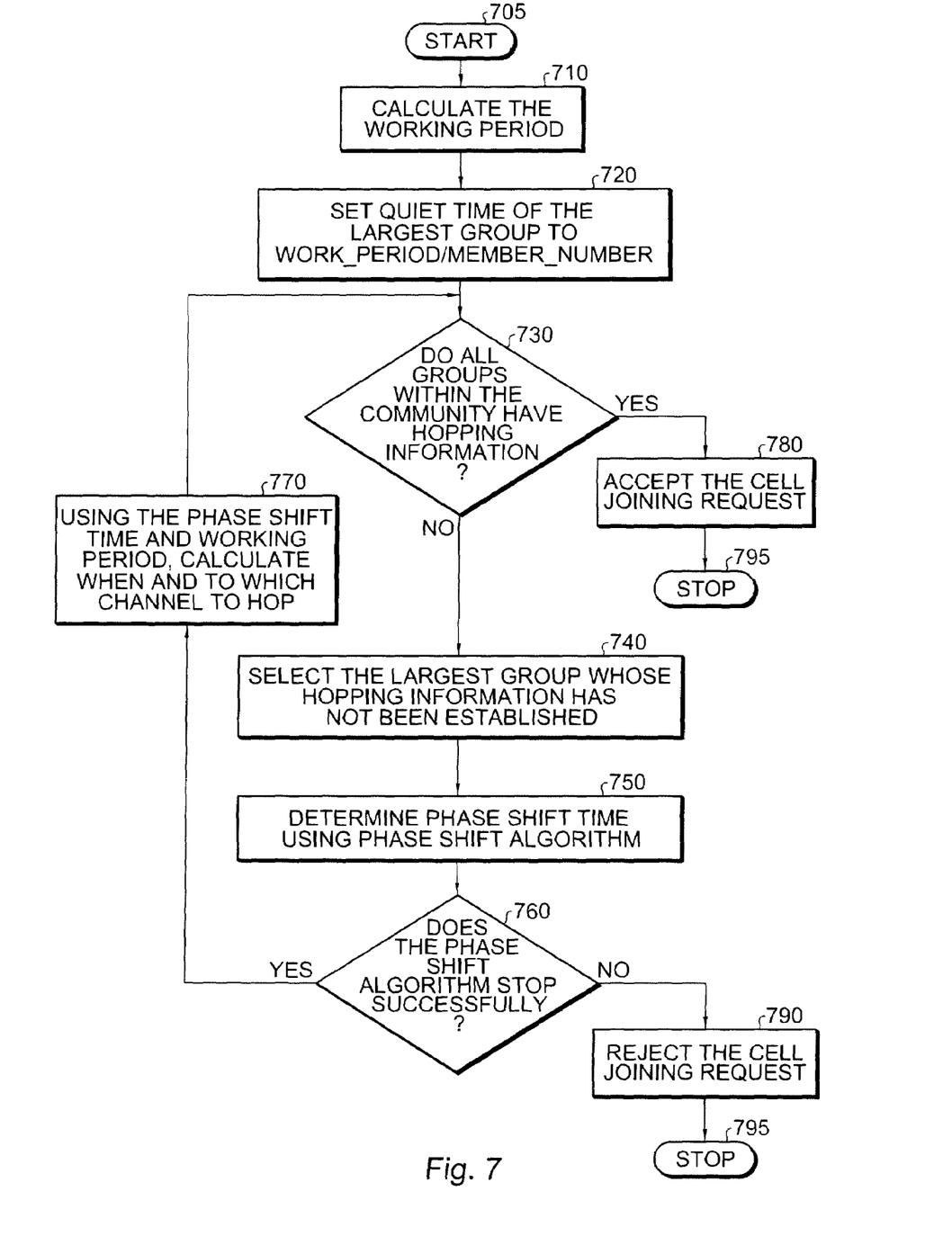
FIG. 7 is a flowchart of one method for determining the hopping pattern of a DFH Community having a plurality of DFH Community groups according to the present invention.

FIG. 3 is a flowchart of one method embodiment for determining whether a WRAN cell can join an established DFH Community according to the present invention. According to one embodiment of the present invention, the leader cell decides whether a WRAN that is requesting admission to the DFH Community is accepted. FIGS. 3, 5 and 7 are flowcharts illustrating methods of implementing an exemplary process for determining a hopping pattern in a DFH Community according to one embodiment of the present invention.

In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks. Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process 300 begins 305 by the determination 310 of whether the DFH Community, which is assumed to be a simple community, would become a complex community upon acceptance of the new cell. A community group within the DFH Community is complex if it has more than two neighbor groups or two or more neighbor groups have more than one neighbor cell. When two groups have at least one common WRAN cell other than the leader cell, these two groups are referred to as neighbor groups. Thus if the addition of the new cell drives the community group to change from a simple classification to that of complex, the request for acceptance is rejected 315 and the process stops 395.

The next query 320 is whether the joining cell will join the largest community group in the DFH Community. As the number of required channels for the DFH Community is driven by the community group with the largest number of cells, adding an additional cell to the community group having the largest number of cells will alter the required number of channels for the entire DFH Community. When the answer to the query 320 regarding whether the cell is joining the largest community group is no, the process determines whether a new group graph configuration from the addition of the new cell would remain 325 a strict two-color uncolorable group graph.

When the answer to the query 320 regarding whether the cell is joining the largest community group is yes, the number of usable channels required to carry out the DFH in the DFH Community is set 330 according to the community group having the largest number of WRAN cells after the new cell is accepted plus the number 1. Similarly when it is determined that the addition of the new WRAN cell will form a group graph that is a strict two-color uncolorable group graph, the number of usable channels required to carry out the DFH in the DFH Community is set 335 according to the community group having the largest number of WRAN cells after new cell is accepted plus the number 2.

Using the number of WRAN cells of the largest community group within the DFH Community plus the number 1 or the number 2, the shortest length of a single transmission, i.e., the shortest working period, is determined 340. This determination, according to one embodiment of the present invention, can be found by applying algorithm 1 as constrained by inequalities 2 and 3:

$$P_w^{sm} = \left(\frac{M_{ch}}{N_{ch}}\right) \cdot P_w^{max} \quad (1)$$

$$M_{ch} \geq M + 1 \quad (2)$$

$$N_{ch} \geq N + 1 \quad (3)$$

One skilled in the relevant art will recognize that M represents the number of WRAN cells of the smallest community group in which at least one cell does not belong to any other larger group. Similarly N represents the number of WRAN cells of the larger or largest community group. $M_{ch}$ stands for the number of working channels of the smallest community group in which at least one cell does not belong to any other larger group. $N_{ch}$ represents the number of working channels of the larger or largest community group in which at least one cell does not belong to any other larger group. Both of these numbers are determined by the leader cell. $P_w^{sm}$ represents the smaller or smallest working period and $P_w^{max}$ stands for the maximal working period.

Once calculated the shortest working period, or the shortest length of a single transmission, is compared to the number of WRAN cells in the group and the need for a quiet period to see whether this short period is long enough to meet the needs of the group 345. When the answer to the question is in the negative, the request by the WRAN cell to join the DFH Community is rejected 315 and again the process stops 395. Should the answer be yes, the process explores whether the joining cell has any one-hop neighbors other than the leader 350. When the answer is no, a new community group is created 365 comprised of the new joining cell and the community leader. When the answer is yes, the process selects all community groups that have one-hop neighbors with the joining cell as candidate community groups 335. When all of the candidate groups that have been proposed 360 meet the DFH Community requirements, the leader accepts 380 the new cell into the DFH Community.

However when an analysis of the proposed groups formed by the joining cells fails to identify all of the possible configurations, a new community group is formed 375 that includes the joining WRAN cell and all of the cells that are one-hop neighbors of the joining cell. This addition of a new group into the community both here and at step 365, requires the DFH Community to consider whether, with the addition of the new group, there will be enough usable channels to conduct DFH among all of the members of the community. Recall that it is possible that the WRAN cell attempting to join the community does not have enough available channels. Thus it is possible that the addition of the new cell will not add to the number of usable channels but will force a more complex hopping scheme requiring more channels. Thus the question is posed whether with the addition of the newly created group there are more usable channels available than are required 370. Step 370 includes two parts: first, whether the number of usable channels in the largest group after a cell joins the DFH Community is larger than the number of WRAN cells in the largest group of the new DFH Community plus the number 1 or the number 2, and second whether the number of usable channels in the group gaining a new WRAN cell after the cell joins (referred to as the joining group) is larger than the WRAN cell number of the joining group plus the number 1 or the number 2. The answer to the query 370 is yes when the answer to both of the above questions is yes. Otherwise the answer is no. An answer in the negative to this step 370 will result in the rejection 315 of the request to join the group. While an answer in the affirmative removes the last hurdle in the process and allows the leader cell to temporarily accept 380 the joining cell's request to become a member of the DFH Community (acceptance being conditional on a successful determination of a hopping mode by the leader).

Figure 4:
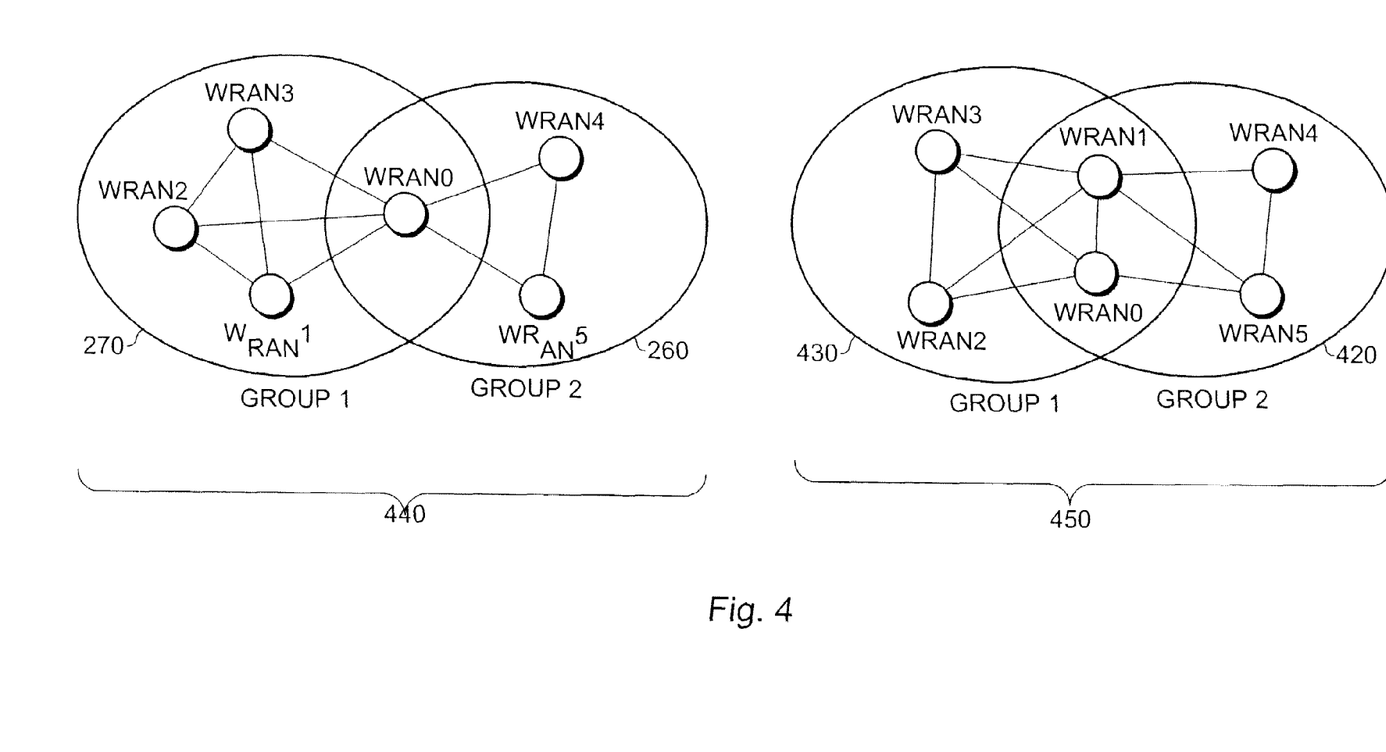
FIG. 4 shows a comparison of two WRAN cell community group configurations in a DFH Community according to one embodiment of the present invention.

According to one embodiment of the present invention, the determination of a hopping pattern varies depending on whether the DFH Community includes neighbor groups. FIG. 4 shows a comparison of two WRAN cell community group configurations in a DFH Community according to one embodiment of the present invention. The DFH Community 440 on the left side of FIG. 4 is a reproduction of the DFH Community described in FIG. 2. Note that each WRAN cell is one-hop from the leader cell and that no WRAN cells other than the leader are common to either group. The DFH Community depicted on the right side of FIG. 4 shows the same number of WRAN cells and each WRAN cell is one-hop from the leader cell but WRAN1 410 is a member of both community groups 430, 420. Groups that have at least one common WRAN cell besides the leader cell are neighbor cells. In this case WRAN1 410 is defined as the neighbor group cell as it belongs to at least two groups and is not the community leader.

According to one embodiment of the present invention, for community groups of a DFH Community that do not have a neighbor group cell, and thus are not neighbor groups, the determination of a hopping pattern is determined by the following algorithms.

$$T^{ij}_{x_m} = \{T^{ij}_{x_1} + P^{cur}_w * (m-1)\} - P^{min}_w * (x_m - x_1) \quad (4)$$

-continued $$T^{jk}_{x_m} = \{T^{jk}_{x_1} + P^{min}_w * (x_m - x_1)\} - P^{cur}_w * (m-1) \quad (5)$$

$$T^{ij}_{x_1} + \{P^{cur}_w * (N^{ch}_{cur} - 2) + T^{ij}_s * (N^{ch}_{cur} - 3)\} + T^{jk}_{x_1} = P^{min}_w * (N^{ch}_{max} - 1) \quad (6)$$

$$\text{MIN}_{x_m}(T^{ij}_{x_m}) = \text{MIN}_{x_m}(T^{jk}_{x_m}) = T^{ij}_s \quad (7)$$

Where
$1 \leq m \leq N^{ch}_{cur}$
$N^{ch}_{cur} \geq (N_{cur} + 1)$
$N^{ch}_{max} \geq (N_{max} + 1)$ In equations 4-7 the following variable definitions apply.

$x_m$ is the channel sequence number of the $m^{th}$ channel used by the current group.

$N_{max}$ is the number of WRAN cells in the largest community group.

$N_{cur}$ is the number of WRAN cells in the current group.

$P_w^{min}$ is the working period in the community group having the largest number of WRAN cells.

$P_w^{cur}$ is the working period in the current community group.

$N_{max}^{ch}$ is the number of working channels in the largest community group.

$N_{cur}^{ch}$ is the number of working channels in the current group.

$T_x^{ij}$ is the phase shift time (quiet period) in working periods between group i and group j in channel x.

$T_s^{ij}$ is the phase shift time (quiet period) in working periods between group j and group j in channel s.

$T_x^{ji}$ is the phase shift time (quiet period) in working periods between group j and group i in channel x Similarly and according to one embodiment of the present invention, for community groups of a DFH Community that do have a neighbor group cell, and thus are neighbor groups, the determination of a hopping pattern is made by the following algorithms. In such a community each neighbor cell is either labeled as an A cell or a B cell. The determination of a hopping pattern is determined by the following algorithms.

$$T^{ij}_{x_m} = (T^{ij}_{x_1} + P^{cur}_w * (m-1)) - P^i_w * (x_m - x_1) \quad (8)$$

$$T^{jk}_{x_m} = T^{jk}_{x_1} + P^k_w * (x_m - x_1) - P^{cur}_w * (m-1) \quad (9)$$

$$(T^{ii}_s + P^A_w) * G_A + T^{ij}_{x_1} + \quad (10)$$
$$T^{ij}_s * (N^{ch}_{cur} - G_A - G_B - 3) + P^{cur}_w * (N^{ch}_{cur} - G_A - G_B - 2) +$$
$$T^{jk}_{x_1} + (T^{kk}_s + P^B_w) * G_B = P^{min}_w * (N^{ch}_{max} - 1)$$

$$\text{MIN}_{x_m}(T^{ij}_{x_m}) = \text{MIN}_{x_m}(T^{jk}_{x_m}) = T^{ij}_s \quad (11)$$

Where
$1 \leq m \leq (N_{cur} + 1)$
$N^{ch}_{cur} \geq (N_{cur} + 1)$
$N^{ch}_{max} \geq (N_{max} + 1)$ In equations 8-11 the following variable definitions, in addition to those previously presented, apply.

$x_m$ is the channel sequence number of the $m^{th}$ channel used by the current group.

$G_A$ is the number of cells labeled with an A.

$G_B$ is the number of cells labeled with a B.

$T_s^{ii}$ is the phase shift time (quiet period) associated with group i to which A type of WRAN cells belong.

$T_s^{kk}$ is the phase shift time (quiet period) associated with group k to which B type of WRAN cells belong.

$T_s^{jj}$ is the phase shift time (quiet period) in working periods between group j and group j in channel s.

Equations 4-11 attempt to use a smaller number of working channels in the groups having a smaller number of WRAN cells as compared to the maximum of the number of WRAN cells in any group of the DFH Community plus the number 2, or the maximum of the number of WRAN cells in any group of the DFH Community plus the number 1. For example, DFH Community 200 of FIG. 2 requires five working channels for the DFH Community to work in frequency hopping mode. Group 1 270 will require all of these five channels since Group 1 270 includes four WRAN cells. But since Group 2 260 includes only three WRAN cells, it will use only four channels out of these five available channels. The hopping mode of Group 2 260 will be described in FIG. 9.

FIGS. 5-8 are flowcharts and high level depictions of the process for calculating a hopping pattern for a DFH Community in which, according to one embodiment of the present invention, the community is defined as a plurality of WRAN cells that are each one-hop neighbors of the leader. As one skilled in the art will appreciate, each community group within the DFH Community must coordinate with each other group to ensure that that their channel usage does not conflict with that of any other overlapping group. As the leader is the only cell with a common link to each group, it is the leader's responsibly to set the channel hopping pattern, which includes a determination of a working period, quiet period and phase shift for each group.

The first step in the process of determining a hopping pattern is to label each neighbor group WRAN cell in the DFH Community as either a cell A or a cell B. According to one embodiment of the present invention, neighbor cells are labeled as either A or B so that when the hopping mode is determined, the neighbor cell labeled A will be the first cell (except the leader cell) to use channel 1 and the neighbor cell labeled B will be the last cell to use channel 1. When two neighbor cells of a group are both labeled A, these two neighbor cells are the first two cells to use channel 1. When two neighbor cells of a group are both labeled B, these two neighbor cells are the last two cells to use channel 1. This process is shown graphically in FIGS. 5 and 6. Recall that a neighbor group WRAN cell is defined as the WRAN cell which belongs to two community groups and is not the community leader.

Figure 6:
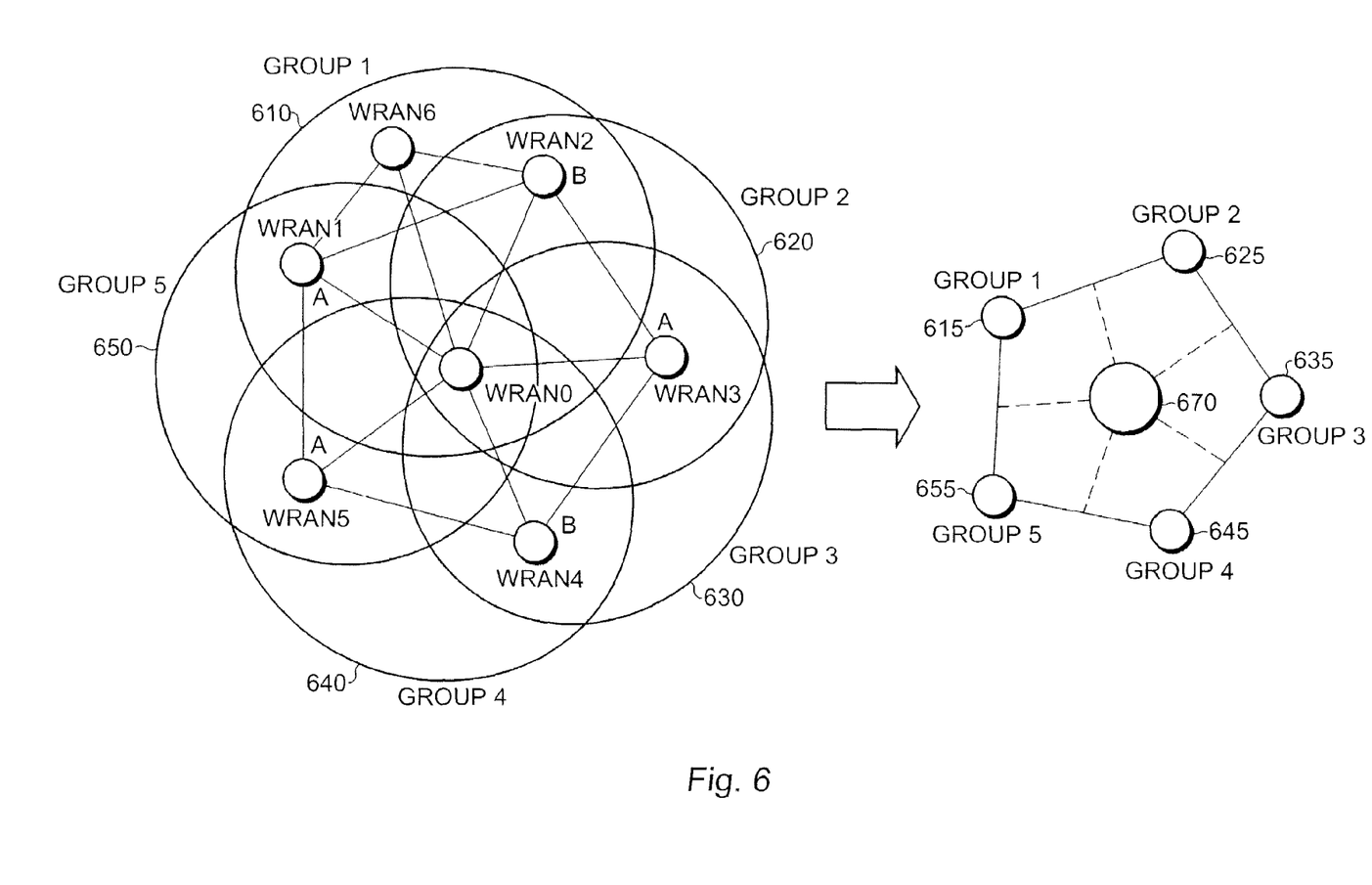
FIG. 6 is a high level depiction of a DFH Community and its correlation to a group graph representation, according to one embodiment of the present invention.

Referring now to FIG. 5, the process 500 begins 505 with the selection of the DFH Community group having the largest number of WRAN cells 510. From that point of reference a determination is made whether a corresponding group graph possesses a two-edge connection characteristic 520. A group graph is a nodal representation of the DFH Community in which each group is a node and the connections between groups is termed an edge. FIG. 6 shows a depiction of a DFH Community according to one embodiment of the present invention and a group graph representation of the same DFH Community. On the left is a DFH Community including five DFH Community groups labeled Group 1-5 610, 620, 630, 640, 650. On the right side of FIG. 6 is a group graph depiction of the same DFH Community having five nodes representing Groups 1-5 615, 625, 635, 645, 655. Note that the leader cell is absent since it is a member of each group. Each of these nodes is connected by an edge 670. Group 1 615, for example, possesses two edges 670. One edge 670 couples Group 1 615 to Group 2 625 and a second edge couples Group 1 615 to Group 5 655. Thus the group graph shown in FIG. 6 is a two-edge connected group graph.

Referring again to the flowchart of FIG. 5, upon a positive determination that the group graph is a two-edge connected graph 520, a neighbor group is selected 530 having fewer or equal number of WRAN cells. In this case Group 1 610 (referring to FIG. 6) has four WRAN cells of which two neighbor group cells, WRAN1 and WRAN2, are labeled as an A and B. When a group has only one neighbor cell, the neighbor cell can be labeled as either an A or B. The process moves to Group 2 620 which has three WRAN cells of which two are neighbor group WRAN cells: WRAN 2 and WRAN3. Since WRAN2 was previously labeled B, WRAN3 is labeled A. As one skilled in the art will appreciate, the process could initially have either chosen Group 1 or Group 5 as both possess the same number of WRAN cells.

In the situation in which a group graph is not a two-edge connected graph, the labeling of subsequent groups is random 540. With the labeling of Group 2 620 complete, the process shown in FIG. 5 moves on to determine whether any groups in the DFH Community are unlabeled 550. When the answer is no, the labeling process ends 595. When the answer is yes, the process shown in FIG. 5 moves on 560 to determine whether the most recent labeled group has an unlabeled neighbor group. When the answer is yes, the process moves on 565 to label the neighbor cells of the unlabeled neighbor group as an A or B. Thereafter the process 500 returns to the question of whether any group is unlabeled 550. When the answer for 560 is no the process shown in FIG. 5 moves on to determine 570 whether the other previously labeled groups have an unlabeled neighbor group or groups. When the answer is yes, the process moves on 575 to label the neighbor cells of the identified unlabeled neighbor group as an A or B. Thereafter the process 500 returns to the question of whether any group is unlabeled 550. When the answer for 570 is no the process shown in FIG. 5 moves on 580 to randomly select an unlabeled group and label its neighbor cells as an A or B. Thereafter the process 500 again returns to the question of whether any group is unlabeled 550.

The process 500 shown in FIG. 5 results in an A and B labeling of each neighbor cell of each group shown in FIG. 6. In this particular example the process began at Group 1 610, the group having the largest number of WRAN cells and continued clockwise labeling each group in alternating fashion, A or B. The process 500 could have labeled the neighbor cells in a counterclockwise direction without impacting the channel hopping pattern determination process.

With the DFH Community group graph determined, and with a leader identified, the leader can determine the hopping pattern. When the group graph of a DFH Community is a strict 2-color uncolorable graph, a hopping shift, as shown in FIG. 8, is used to determine the hopping mode of each group of the DFH Community.

FIG. 7 shows a flowchart of one method embodiment for determining group hopping pattern according to the present invention. The process 700 begins 705 by calculating 710 the DFH Community working period. This step is accomplished by applying equation (1) as discussed previously. Once the working period is determined, the quiet period of the largest DFH Community group is set 720 by dividing the working period by the number of members (WRAN cells) in the DFH Community.

A query is then posed whether each DFH Community group within the DFH Community possesses channel hopping information 730. When the answer is yes, the community leader accepts 780 the cell joining request and the process 700 ends 795. When there are groups that do not have hopping patterns, the process 700 selects 740 the group having the largest number of WRAN cells from the groups lacking a hopping pattern. Using algorithms 4-7 or 8-11 phase shifting times are determined 750 depending on whether the group needing the hopping pattern is associated with or without a neighbor group respectively. Based on these calculations a question is raised whether the phase shifting algorithms stop successfully 760. When they do stop the phase shift time and working period are used to calculate 770 when and to which channel a hop is to occur. With all groups having a hopping pattern the process again ends 795. When the phase shifting algorithms fail to stop indicating an untenable configuration for the DFH Community, the process rejects the cell joining request 790 and the process terminates 795.

Figure 8:
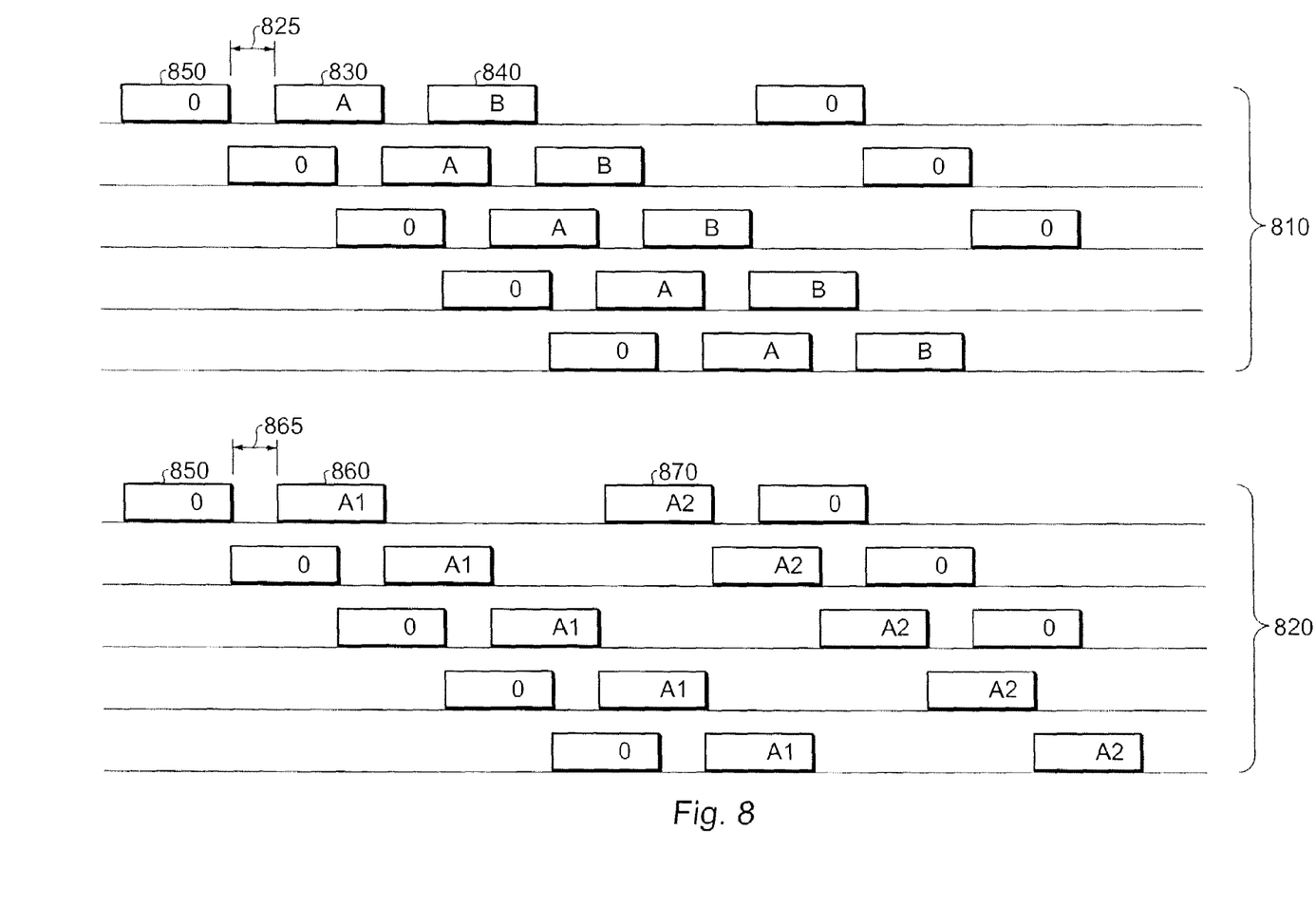
FIG. 8 is a high level depiction of the hopping patterns for a DFH Community according to the present invention according to a group graph label.

To better understand the hopping pattern calculation, a graphical representation of the relationship between the working period and quiet time for each channel used in the DFH Community, according to one embodiment of the present invention, is shown in FIG. 8. FIG. 8 shows two hopping patterns of groups in depicted in FIG. 2. The upper portion of FIG. 8 810 is the hopping mode of a single group with its neighbor cells labeled A and B. In this situation a group has two neighbor cells labeled as A and B for Group 1 231, Group 2 232, Group 3 233, and Group 4 234. In this case there are five channels 810. The working period is shown as the length of the blocks 0, A and B (850, 830, 840 respectively). The period between the blocks represents the quiet period 825.

The lower portion of FIG. 8 820 is a depiction of the hopping mode of a group with two neighbor cells labeled A or B. In this scenario two neighbor cells are both labeled as an A. Note that there are five working channels 820. The working period is shown as the length of the blocks 0, A1 and A2 (850, 860, 870 respectively). The period between the blocks represents the quiet period 865.

Figure 9:
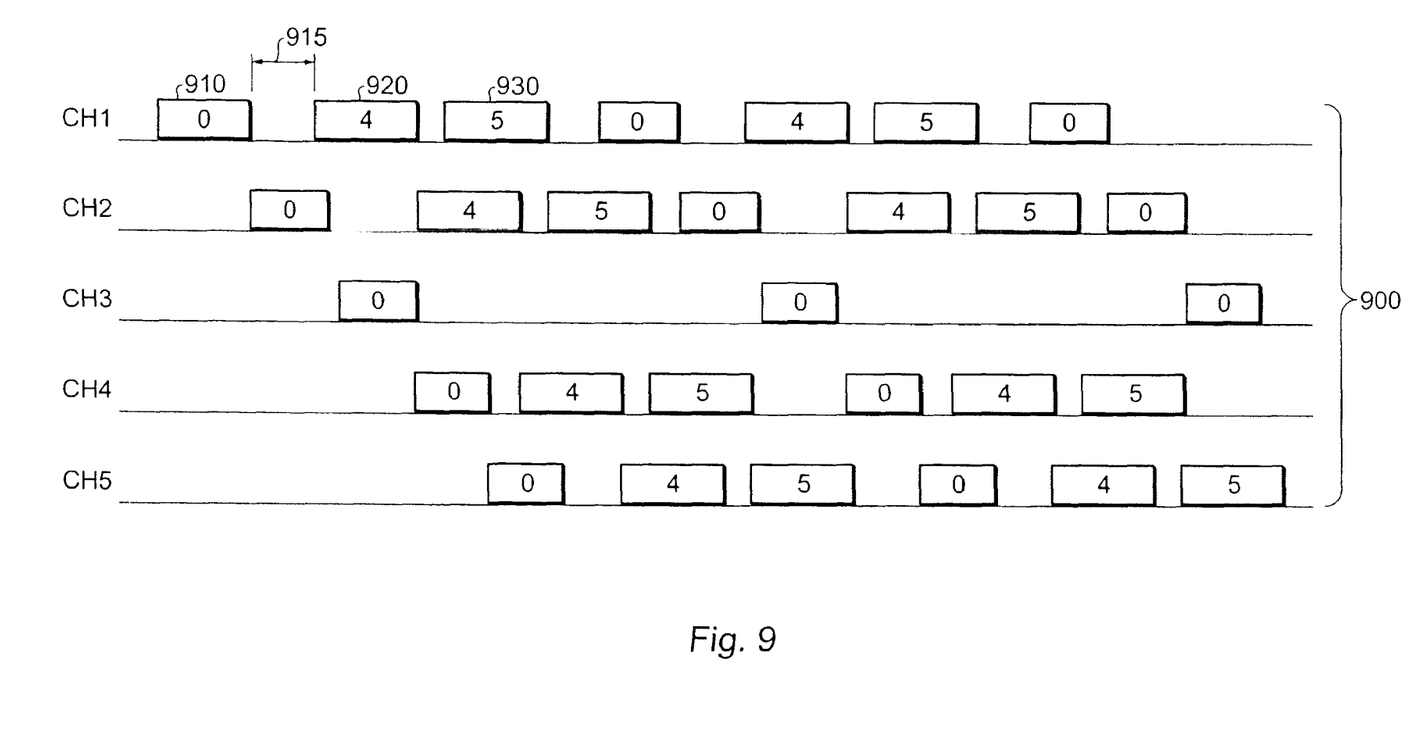
FIG. 9 shows a hopping pattern of Group 2 shown in FIG. 2A, according to one embodiment of the present invention.

FIG. 9 shows a hopping pattern of Group 2 260 shown in FIG. 2A, according to one embodiment of the present invention. As previously discussed, this particular group requires N+1 channels since this group graph is a 2-color colorable group graph. In this case Group 2 260 uses four channels out of community 200's five working channels. The working period is shown as the length of the blocks 0, 4 and 5 (910, 920, 930 respectively). The period between the blocks represents the quiet period 915.

While there have been described above the principles of the present invention in conjunction with specific DFH Community architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for dynamic frequency hopping ("DFH") among a plurality of wireless regional area network ("WRAN") cells wherein each WRAN cell includes a base station ("BS") and a plurality of consumer premise equipments ("CPEs") associated with the BS, the system comprising:
   a DFH Community formed from the plurality of WRAN cells wherein at least one of the plurality of WRAN cells in the DFH Community is a leader cell and wherein each other of the plurality of WRAN cells within the DFH Community is a one-hop neighbor of the leader cell;
   a number of channels for communicating between each of the CPEs and BS of the plurality of WRAN cells; and
   a hopping pattern set by the leader cell wherein the hopping pattern hops over the number of channels providing interruption free working channels and mutual interference-free sensing among each of the plurality of WRAN cells in the DFH Community.

2. The system of claim 1 wherein a subset of the plurality of WRAN cells that are one-hop neighbors of each other and are each one-hop neighbors of the leader cell form a DFH Community group.

3. The system of claim 2 wherein the DFH Community includes a plurality of DFH Community groups.

4. The system of claim 3 wherein each community group in the DFH Community is identified with a first color or a second color and responsive to at least two adjacent community groups being identified with a same first color or a same second color, then the number of channels is equal to a maximum number of WRAN cells in any of the plurality of DFH Community groups of the DFH Community plus 2.

5. The system of claim 3 wherein each community group in the DFH Community is identified with a first color or a second color, and responsive to each community group identified with the first color being adjacent to community groups of the second color, the number of channels is equal to a maximum number of WRAN cells in any of the plurality of DFH Community groups of the DFH Community plus 1.

6. The system of claim 3 wherein the length of a single transmission is defined as a working period and wherein a shorter working period, $P_w^{sm}$, is defined by the equation $$P_w^{sm} = \left(\frac{M_{ch}}{N_{ch}}\right) \cdot P_w^{max} \text{ wherein}$$

$M_{ch}$ is greater than or equal to a minimum number of WRAN cells in any of the plurality of DFH Community groups of the DFH Community plus 1, and wherein
$N_{ch}$ is greater than or equal to the largest number of WRAN cells in any of the plurality of DFH Community groups of the DFH Community plus 1, and wherein
$P_w^{max}$ is the length of a working period in the community group with a minimum number of cells on any of the number of channels.

7. The system of claim 3 wherein each community group in the DFH Community is identified with a first color or a second color and wherein the hopping pattern set by the leader cell is based on whether at least two adjacent community groups are identified with a same first color or a same second color.

8. The system of claim 1 wherein a request from a WRAN cell outside of the DFH Community to join the DFH Community is decided by the leader cell based on combined channels useable by the DFH Community and the WRAN cell requesting to join the DFH Community.

9. The system of claim 8 wherein the request from the WRAN cell outside of the DFH Community to join the DFH Community is rejected responsive to a determination that addition of the WRAN cell to the DFH Community would create a new DFH Community group having more than two neighbor groups wherein a neighbor group includes at least one common WRAN cell other than the leader cell.

10. A method for dynamic frequency hopping ("DFH") among a plurality of wireless regional area network ("WRAN") cells wherein each WRAN cell includes a base station ("BS") and a plurality of consumer premise equipments ("CPEs") associated with the BS, the method comprising:
  forming a DFH Community from the plurality of WRAN cells wherein at least one of the plurality of WRAN cells in the DFH Community is a leader cell and wherein each other of the plurality of WRAN cells within the DFH Community is a one-hop neighbor of the leader cell;
  determining a number of channels for communicating between each of the CPEs and BS of the plurality of WRAN cells within the DFH Community; and
  by the leader cell, setting a channel hopping pattern wherein the channel hopping pattern hops over the number of channels providing interruption free working channels and mutual interference-free sensing among each of the plurality of WRAN cells in the DFH Community.

11. The method of claim 10 wherein a subset of the plurality of WRAN cells within the DFH Community that are one-hop neighbors of each other and are each one-hop neighbors of the leader cell form a DFH Community group.

12. The method of claim 11 wherein the DFH Community includes a plurality of DFH Community groups.

13. The method of claim 12 wherein each community group in the DFH Community being identified with a first color or a second color and wherein the number of channels is equal to a maximum number of WRAN cells in any of the plurality of DFH Community groups of the DFH Community plus 2 responsive to at least two adjacent community groups being identified with a same first color or a same second color, and wherein the number of channels is equal to a maximum number of WRAN cells in any of the plurality of DFH Community groups of the DFH Community plus 1 responsive to each community group identified with the first color being adjacent to community groups of the second color.

14. The method of claim 13 further comprising receiving a request from an additional WRAN cell outside of the DFH Community to join the DFH Community.

15. The method of claim 14 further comprising determining whether a set of usable channels formed from channels associated with the additional WRAN cell and channels associated with the DFH Community are greater than or equal to the number of channels required by the combination of the DFH Community and the additional WRAN cell.

16. The method of claim 15 further comprising rejecting the request responsive to the set of usable channels being less than the number of channels required by the combination of the DFH Community and the additional WRAN cell.

17. The method of claim 15 further comprising accepting the request responsive to the set of usable channels being greater than or equal to the number of channels required by the combination of the DFH Community and the additional WRAN cell.

18. The method of claim 13 further comprising determining a minimum length of a single transmission based on a set of usable channels formed from channels associated with the additional WRAN cell and channels associated with the DFH Community.

19. The method of claim 18 further rejecting the request responsive to the minimum length of a single transmission based on the set of usable channels being inadequate.

20. A base station ("BS") in communication with a plurality of consumer premise equipments ("CPEs") using dynamic frequency hopping ("DFH") forming a wireless regional area network ("WRAN") cell, said BS comprising:
  a machine capable of executing instructions embodied as software; and
  a plurality of software portions, wherein
  one of said software portions is configured to transmit a request to a DFH Community wherein the DFH Community includes a plurality of WRAN cells separate from the WRAN cell and wherein at least one of the plurality of WRAN cells in the DFH Community is a leader cell and wherein each other of the plurality of WRAN cells within the DFH Community is a one-hop neighbor of the leader cell;
  one of said software portions is configured to respond to a request from the leader cell for a list of channels associated with the BS with said list of channels; and
  responsive to receiving acceptance of the request, one of said software portions is configured to execute a channel hopping pattern set by the leader cell.

21. The BS of claim 20 wherein the channel hopping pattern is based in part on a number of channels equal to a maximum number of WRAN cells in any of a plurality of DFH Community groups of the DFH Community plus 2, wherein a DFH Community group is defined as a subset of the plurality of WRAN cells within the DFH Community that are one-hop neighbors of each other and are each one-hop neighbors of the leader cell from a DFH Community group.

* * * * *